Oct. 19, 1965 C. W. FRITZE ETAL 3,213,422

CONTROL CIRCUIT FOR DOCUMENT READER

Filed Sept. 29, 1961 2 Sheets-Sheet 1

INVENTORS
CURTIS W. FRITZE
HERBERT F. SOMERMEYER
BY Thomas J. Nikolai
AGENT

INVENTORS
CURTIS W. FRITZE
HERBERT F. SOMERMEYER
BY Thomas J. Nikolai
AGENT

United States Patent Office 3,213,422
Patented Oct. 19, 1965

3,213,422
CONTROL CIRCUIT FOR DOCUMENT READER

Curtis W. Fritze, Arden Hills, and Herbert F. Somermeyer, Roseville, Minn., assignors to Sperry Rand Corporation, New York, N.Y., a corporation of Delaware
Filed Sept. 29, 1961, Ser. No. 141,876
5 Claims. (Cl. 340—146.3)

This invention relates to apparatus for detecting the significance of the configuration of written, typed, or printed symbols (or characters), and more specifically to a novel circuit for controlling the transducing device employed in such apparatus.

In data processing system there has been recent emphasis on automatic reading or sensing of written, typed or printed copy. Many schemes of varying reliability, speed, and ability have been proposed for detecting such symbols or characters. This invention provides apparatus which is capable of scanning and detecting many symbols in a very short period of time.

The symbols to be detected are scanned by a flying spot scanner, a television camera, or other suitable optical sensing means. A slit, which may be mechanical or optical, may be positioned effectively between the symbol to be detected and the scanning apparatus, such as to permit only one symbol for example to be detected at any one instant of time. The control circuit of this invention provides means whereby the horizontal sweep of the scanner may be controlled by the initial detection of a symbol and the motion of the document containing the symbols to be detected, while the vertical sweep may be controlled by a sawtooth generator operator in synchronism with the rest of the system. The resulting video signal is fed to a plurality of small cathode ray tubes for example, to visually reproduce the symbol being detected. A mask or slit having a configuration representative of one predetermined symbol in toto, or in part as the representation of the unique areas distinguishing this symbol from all others in the group, is effectively placed between the cathode ray tube presentation of the reproduced symbol and respective photoelectric sensing means, i.e., each mask has a configuration representing a different symbol. One acceptable symbol. One acceptable symbol is arbitrarily assigned to each mask. The light intensity impinging on each photoelectric sensing means associated with each cathode ray tube varies as the degree of likeness between the electronic reproduction of the symbol to be detected and the mask configuration. As a result, an electrical indication is provided showing which of the acceptable symbols is identical to a detected symbol. The present invention is concerned with an improved circuit for controlling the horizontal scan of the flying spot scanner to improve the reliability of the recognition circuitry.

Therefore it is an object of this invention to provide improved high-speed symbol detection apparatus.

It is another object of this invention to provide symbol detection apparatus which enhances the probability of correct symbol detection by utilizing a scan control circuit which differentiates between symbols to be read and extraneous marks or smudges which may be present on the document.

Other objects and advantages of this invention will become obvious to those skilled in the art after a reading of this specification and examination of the appended drawings wherein.

Figures 1, 2, 3, 3A:
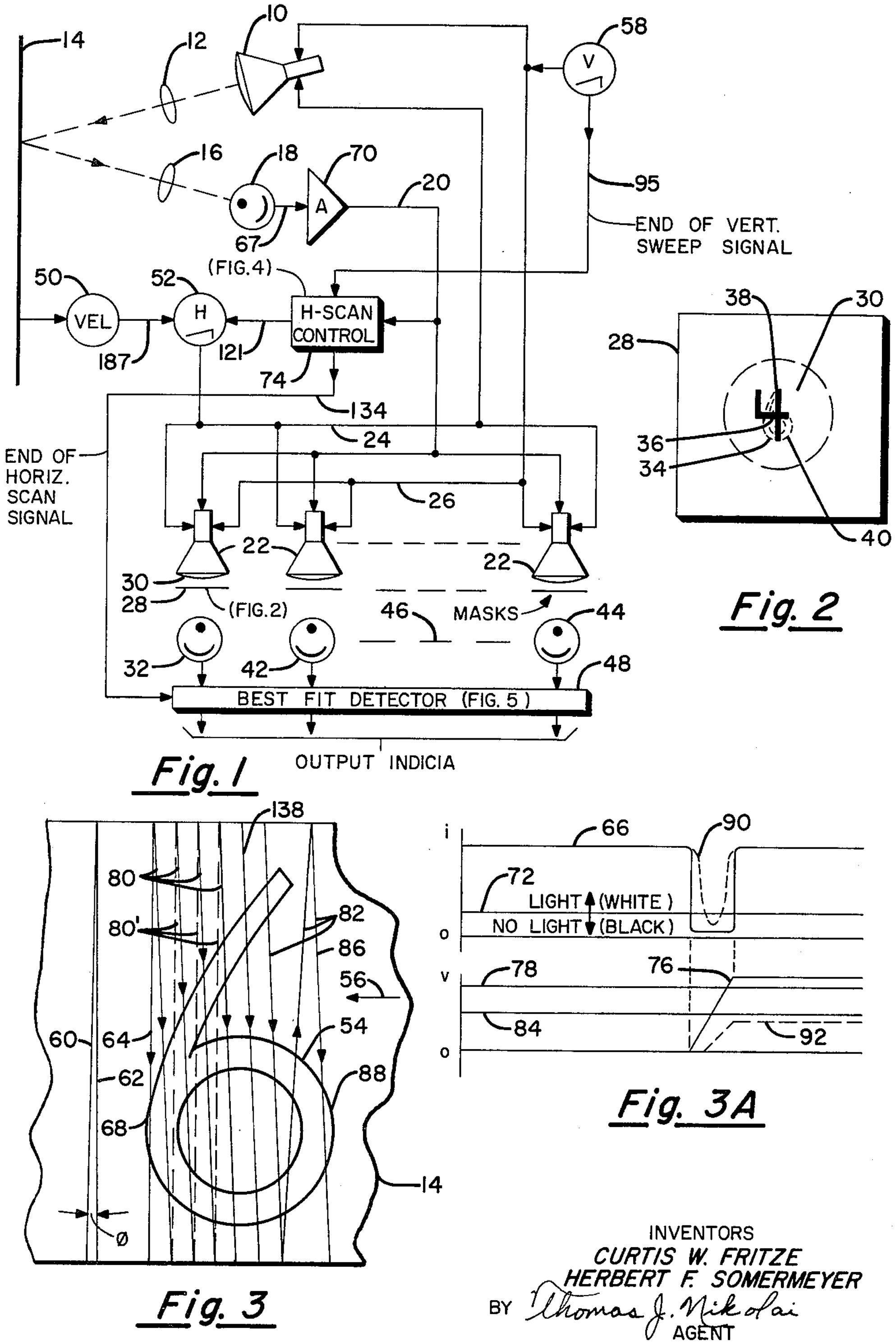
FIG. 1 illustrates an exemplary embodiment of this invention for scanning a single line or column of symbols.
FIG. 2 illustrates a mechanical mask for comparing detected and displayed symbols with a given predetermined acceptable symbol.
FIGS. 3 and 3A illustrate the relationship of certain vertical sweeps with a typical symbol to be detected showing thresholds to be established when using one version of this invention.

With reference to FIG. 1, a projection kinescope 10 produces a flying spot raster through lens system 12 to scan a symbol to be detected on a suitably supported document 14. The surface of document 14 reflects the flying spot impinging thereon through a lens 16 to a photoelectric cell such as photomultiplier tube 18 or any other photosensitive device thereby impressing a beam of varying light intensity on tube 18 according to the contour and color of the symbol(s) being detected. Photomultiplier tube 18 converts the varying light beam into a corresponding video signal (black and white) on line 20 which is fed to the $z$-axis (intensity) electrodes of a plurality of cathode ray tubes (CRT's) 22. The deflection of the electron beams of each of the cathode ray tubes is synchronized with the deflection of the kinescope 10 by providing common horizontal sweep voltages over line 24 and common vertical sweep voltages over line 26 to both the kinescope 10 and CRT's 22. Thus on the face of each CRT 22 there is presented a replica of the area being scanned by projection kinescope 10. As will be later explained in the preferred embodiment of this invention, the symbol being detected is represented on the face of CRT's 22 as a dark area (no light) with a light background (high intensity light).

A more detailed description of a typical flying spot scanning system which is capable of preforming the above described functions is described in the Radio-Electronic Engineering Edition of Radio and Television News, Vol. 6, Number 4, April, 1951, on pages 7A through 9A in the article by R. L. Kuehn and R. K. Seigle entitled "Rack-Mounted Flying Spot Scanner." Both electronic and mechanical flying spot scanners are well known in the art and for this reason will not be further described herein.

As hereinabove explained the symbol to be detected is reproduced on each and every CRT 22. Alternatively, one CRT may be used with a discrete picture area of the tube face being assigned to each different symbol. In other words, to detect any of ten different symbols for example, ten different CRT's (relatively small) may be employed, or alternatively a single CRT (relatively large) can be used with provision for causing ten different picture areas for simultaneously displaying the same detected symbol.

Immediately in front of each raster or picture area, e.g., on the face of each CRT 22, there is positioned a symbol mask such as mask 28 of FIG. 2. Each symbol mask is non-translucent except for a translucent area in the form of one symbol conveniently termed an "acceptable symbol," i.e., one corresponding in configuration to one of a group of known symbols any one of which might be expected on the document being read. For example as shown in FIG. 2, the translucent area may atcually be an aperture illustrated by dotted line 34 shaped in the form of a numeral 6. Each mask has a different symbol.

Mask 28, being positioned adjacent the face of CRT 30 of FIG. 1, is actually interposed between that CRT and a photosensitive device such as photomultiplier 32. The arrangement is such that only the portion of light generated on the face of CRT 30 coinciding with aperture 34 is passed through to photomultiplier 32. A preferable arrangement for accomplishing the above is to affix the mask 28 directly on the face of the CRT 30. For example, a metal mask may be constructed which will slide into a grooved mask holder (not shown) positioned next to CRT 30 such that the mask touches the face of CRT 30.

Cathode ray tubes 22 are preferably small, for example ones having a one inch diameter face. When a symbol is displayed as a dark character having a lighted background, the light from the face 30 of CRT 22 will pass to photomultiplier tube 32 only if the symbol replica on face 30 does not correspond to the configuration of aperture 34 in mask 28. For example, as in FIG. 2, wherein the numeral 4 is shown superimposed over the aperture 34, it is apparent from inspection of the figure that at least a substantial part of the background light of symbol replica 4 will be admitted through aperture 34 to provide a substantial light source for photomultiplier 32. For example, light is admitted via areas 36, 38 and 40. It is apparent that only if a replica of the FIGURE 6 is presented on face 30 will minimum light be admitted through aperture 34, thereby providing a light intensity null as indication of configuration coincidence between the symbol replica on face 30 and aperture 34. Of course, minimum light results in a minimum of current developed by photomultiplier 32. It is preferred to use a null as indication because it appears to be more reliable to operate around a zero light signal reference than to detect relatively small differences between large light intensities or electrical current amplitudes.

As above indicated, each mask 28 in front of each CRT 22 has a different shaped aperture, thus the aperture in each mask has a different symbol configuration from the apertures in every other mask. In a numerical system ten masks may have apertures shaped in the form of numerals 0 through 9 there being one numeral per mask. Obviously the system may be arbitrarily extended to any number of symbols, for example alpha-numeric or arbitrary shorthand notational systems.

The output currents from the photomultipliers 32, 42 and 44 of FIG. 1 plus the intermediate photomultipliers (not shown) but indicated schematically by the dashed lines 46 are fed into apparatus in detector 48 which may be conveniently termed a "Best Fit Detector." Detector 48 compares the light intensities as detected by all photomultipliers just mentioned and determines which photomultiplier tube is receiving a minimum of light intensity. As a result of this comparison, detector 48 emits an electrical impulse indicating which symbol as represented by the aperture configurations in masks 28 coincides with the symbol replica produced on the faces of all CRT's 22. Detector 48 is provided with a number of output lines as hereinafter described which are equal in number to the number of acceptable symbols, one line being associated with each acceptable symbol. A pulse from detector 48 on one of the output lines at the termination of the symbol scanning period, as hereinafter explained, indicates which of the acceptable symbols is on the document. An absence of a pulse on any one of the output lines is indicative that the symbol on the document being scanned does not correspond to any of the acceptable symbols of the symbol detection apparatus.

It is understood that control functions in addition to the above mentioned apparatus are preferably included to provide a reliably operable symbol detector, for example to synchronize the CRT's with the document scansion and movement and to adjust for compensation of document velocity to obtain the same size symbol replicas on the face of each CRT 22 if the documents are to have different or varying velocities. If a document being read moves at a predetermined constant velocity while being scanned for symbols, the now described controls are not necessary to the operation of this invention. With reference to FIG. 1 document 14 engages velocity indicator 50 to provide an electrical signal indicative of the document velocity to the horizontal sweep generator 52. The horizontal sweep of the kinescope 10 is arbitrarily made to be parallel to the direction of document motion regardless of the orientation of the symbol on said document. Thus as the document velocity is increased the horizontal sweep time is correspondingly reduced to provide a symbol replica of constant and uniform size on the faces of CRT's 22. That is, for a symbol of a given size, as the document velocity is increased the time it takes to scan the symbol is reduced. If the horizontal sweep time is constant the symbol replica will be distorted in that as document velocity is increased, the symbol replica dimension (on CRT's 22) in direction of the velocity would be diminished. The other dimension of course is unaffected. Thus velocity indicator 50 provides a voltage to vary the slope of the sawtooth wave generated by horizontal sweep generator 52. How a signal voltage can vary the slope of a sawtooth sweep generator is described in the book entitled Waveforms, Vol. 19, of the Radiation Laboratory Series, on pages 265 and 266, McGraw-Hill, New York, 1949.

The operation of the embodiment shown in FIG. 1 is such that a symbol is detected each time horizontal sweep generator 52 produces a single sweep. The sweep is initiated by photoelectrically detecting the presence of a symbol that has not previously been detected as will now be described. With reference to FIG. 3 there is shown a symbol 54 to be detected on a document 14 moving in the direction of vector 56. Vertical sweep generator 58 (FIG. 1) is continuously oscillating causing the flying spot to traverse an essential vertical line 60. The velocity of the spot is much greater than the velocity of document 14 so that in a single vertical sweep, document 14 appears to be relatively stationary. As the document speed is increased the vertical sweep of the flying spot may form an angle $\phi$ with the vertical as indicated by line 62. If this angle $\phi$ becomes appreciable so as to cause distortion in the symbol replica on the CRT's 22 of FIG. 1, velocity compensation must be provided to the vertical sweep waveform. However, for most applications of this invention this problem will not occur and is not considered important.

As document 14 proceeds to travel toward the left end of FIG. 3, the symbol 54 comes under the vertical sweep of the flying spot as indicated by vertical sweep line 64. With momentary reference to FIG. 3A, wave 66 represents the ideal current waveform from photomultiplier 18 (FIG. 1) as it appears on line 67 during vertical sweep 64 (FIG. 3). During an interval in which a light background is being scanned there is relatively large amounts of electrical current flowing through photomultiplier 18, while when sweep 64 crosses the black imprint of symbol 54 at point 68 there is a marked decrease in the intensity of the reflected light which substantially reduces the current through tube 18. This variation in light intensity, however, is not necessarily binary in nature, i.e., the light intensity can assume more than just two values; therefore, it is preferable to couple the output of tube 18 to a circuit which will definitely cause it to be a binary signal like waveform 66. Such a circuit is represented by binary amplifier 70 which, for example, can be a trigger circuit with predetermined thresholds for switching from one of two states and thus provide at a given time only one of two possible electrical output signals preferably amplified. An example of such an amplifier is given by Puckle in the form of a Schmitt trigger circuit on page 57 of the book Time Bases, Wiley, 1943. As the current passes a given threshold in one direction a voltage is developed in such a circuit across a suitable input impedance to cause the binary amplifier to shift conduction states and when the current amplitude returns to that threshold from the opposite direction the binary amplifier re-shifts conduction states. Thus the binary amplifier follows the reflected light intensity in a binary fashion giving a positive going pulse (due to inversion in circuit 70) corresponding to the negative going pulse below threshold 72 in FIG. 3A, which permits the symbol detector to ignore extraneous grey areas of the symbol or flaws in or on the document which could contribute to causing errors in symbol detection. For example, in the embodiment of FIG. 1 the threshold between black and white was arbitrarily set as indicated by line 72 of FIG. 3A. The threshold 72 is preferably adjustable to provide detection of symbols recorded by different recording apparatus; for example there are different impressions from a manual and an electric typewriter. A suitable manner of regulating the threshold 72 is to vary the input impedance of binary amplifier 70, thus varying the voltage produced by a given current from photomultiplier 18. If the light intensity to tube 18 is knowingly going to have substantially only two values due to the nature of the symbol impressions on the document, then a circuit for converting to a binary signal is unnecessary though amplification may be desired. In any event, a threshold determining circuit is desirable and this may be included in the tube 18 circuitry.

The output of binary amplifier 70 is fed to the CRT's 22 as heretofore described to form a sharp black-on-white replica of the symbol image. Additionally, parts of the video output signal from amplifier 70 are integrated to provide symbol scan threshold indications by a suitable integrator in scan generator 74 (FIG. 1) as will now be explained. This integrator integrates the positive going output voltage pulses from binary amplifier 70. These pulses are above a predetermined threshold, which may be the lower binary voltage level from amplifier 70, and each corresponds to that part of the respective negative going pulses below threshold 72 in FIG. 3A. Therefore, the voltage pulses indicative of black (no light) are integrated. For wave 66 of FIG. 3A the integral of the output wave 66 below threshold 72, or the positive pulses from amplifier 70 corresponding thereto, appears as the sloping part of wave 76. When the positive pulses to be integrated are of sufficient duration to produce a voltage integration signal greater in amplitude than a predetermined threshold 78 which may arbitrarily be set as the horizontal scan initiation threshold, a horizontal scan may be initiated and one horizontal sweep (in a direction parallel to the document motion) accomplished, as later described in more detail, at the termination of the vertical sweep at which time the held integration voltage is sampled. The horizontal sweep causes the vertical sweep to effectively move across the symbol 54 following for example lines 80 (FIG. 3); the dotted lines 80' indicate the blanked sweep return. It is to be understood that the number of vertical sweeps per horizontal sweep may be varied to suit the situation. Relatively few vertical sweeps, for example ten vertical sweeps per symbol scan (or horizontal sweep), are necessary to provide an operable embodiment. Alternatively, a sweep generally following lines 82 may be followed to eliminate blanking on the vertical sweeps. It is to be understood that the two types of sweep arrangements are shown for illustrative purposes and that in an actual embodiment either one of the types of sweep patterns could be adopted. It is to be understood also that any raster pattern may be adopted for use with this invention, the requirement being that raster patterns on CRT's 22 and kinescope 10 be the same pattern but not necessarily the same physical size. It is preferred that the latter type, i.e., the one represented by lines 82, be adopted because of added simplicity to the system.

Termination of the horizontal sweep and thus termination of the symbol scan is caused by scan generator 74 when it detects the anterior edge of the symbol 54. This is accomplished simply by sampling the above mentioned integrator at the termination of each vertical sweep for a voltage which is less than a predetermined threshold amplitude, for example as indicated by line 84 in FIG. 3A. An example of a scan termination with respect to vertical sweep 86 in FIG. 3 which scans the anterior edge 88 of symbol 54 to produce wave 90 in FIG. 3A is now described. The integral of wave 90 is indicated as the sloping portion of wave 92 which is less in maximum amplitude than threshold 84 and thus indicates that the horizontal symbol scan should be terminated. The last vertical sweep is a horizontal scan, such as sweep 86, may entirely miss the symbol to be detected and thus produce no or negligible integrated voltage in the scan generator 74. All that is required is that the amplitude of integrated voltage 92 be less than threshold 84.

Figures 4, 5:
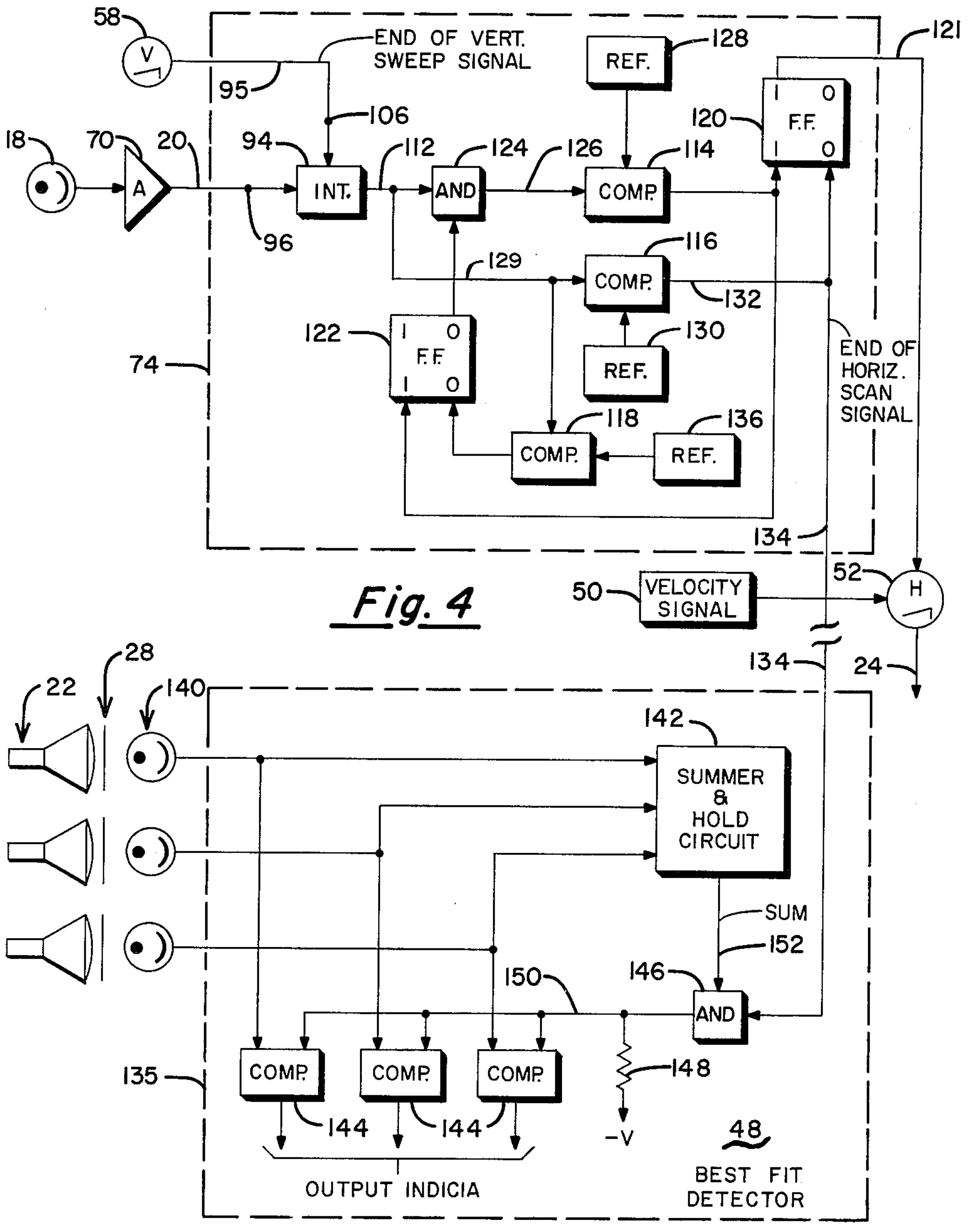
FIG. 4 is a block diagram of an exemplary single scan generator and rate control; and, FIG. 5 is a block diagram of an exemplary best fit detector.

FIG. 4 contains a block diagram showing the novel control circuits of the present invention. It is to be understood that several equivalent means may possibly be devised to accomplish the synchronization and scanning and that the illustrated apparatus is intended to be exemplary. With reference to FIG. 4 the output of amplifier 70 (also shown in FIG. 1) is fed into an integrating circuit 94 which integrates only the voltages indicative of currents from photomultiplier 18 from amplifier 70 which exceed threshold 72 (FIG. 3A) in the black (no light) direction. Additionally, an end-of-vertical-sweep signal, derived as below indicated for example, is transmitted to integrator 94 via line 95 from vertical sweep generator 58 to reset the integrator to a predetermined reference potential and to readout the present voltage integral.

The output of integrator 94 on line 112 is fed to three voltage comparator circuits 114, 116 and 118 which determine when thresholds 78 and 84 are exceeded and when the symbol that has been detected is no longer in the scanning area of kinescope 10 (FIG. 1). These comparators may be of the well known "Multiar" type such as illustrated on page 343 of Waveforms, supra.

The horizontal scan signal produced by generator 52 is controlled by a bistable flip-flop 120. If flip-flop 120 is in its arbitrarily defined "1" state, then by virtue of the signal then conveyed over line 121, sweep generator 52 produces a sawtooth wave the slope of which is determined by velocity indicating means 50. The voltage from the "1" side of flip-flop 120 controls within sweep generator 52 the conduction of a vacuum tube or transistor switch which in turn controls the charging rate of a capacitor (not shown), which may be termed the horizontal sweep capacitor. If flip-flop 120 is in the "1" state then the capacitor in generator 52 is being charged and the horizontal sweep is being effectuated, whereas when flip-flop 120 goes to its "0" state, the horizontal sweep capacitor is discharged causing a horizontal sweep flyback and the horizontal sweep to be effectively inoperative while flip-flop 120 is in its "0" state. Thus the horizontal sweep lasts only as long as flip-flop 120 is in the "1" state. As will become more apparent from the following description, the horizontal sweep time may vary from symbol to symbol, thus flip-flop 120 provides synchronization between the horizontal scanning of the flying spot scanner and the position of the document.

Initiation of the horizontal sweep is caused by an output pulse from the comparator 114 setting flip-flop 120 to the "1" state. The input to comparator 114 may be gated by flip-flop 122 through gate 124 which may be a conventional diode AND circuit. Flip-flop 122 provides an indication of whether or not the output voltage from integrator 94 represents the first vertical sweep which crosses the symbol on the document being read (such as a sweep indicated by line 64 in FIG. 3). Assuming that flip-flop 122 is in the "0" state, gate 124 passes the integrated voltage on line 112 to the input of comparator 114. The integrator output voltage, which is indicative of the total black area scanned in one vertical sweep, occurs only at the termination of the sweep. This voltage on line 126 may be fed to the input terminal of comparator circuit 114 wherein it is compared with a standard voltage from reference source 128. Source 128 may in its simplest form consist of a battery with the voltage taken through the adjustable tap of a potentiometer. Reference source 128 provides the threshold 78 of FIG. 3A. Thus, the output of comparator 114 is indicative that a symbol on document 14, which has not been scanned, has been initially detected and is ready to be scanned. The output pulse from comparator 114 in addition to setting flip-flop 120 to the "1" state to cause initiation of a horizontal sweep, also sets flip-flop 122 to the "1" state, thereby indicating to gate 124 by closing it that the first vertical sweep contacting a symbol has already occurred and that it is therefore unnecessary in a one horizontal scan per symbol type embodiment to initiate any further signal from comparator 114 for further horizontal sweeps as in a multiple horizontal scan per symbol type embodiment. Setting flip-flop 122 to the "1" state prevents a series of pulses from comparator 114 and consequently prevents horizontal scans from being initiated as the symbol traverses the area in which symbols can be detected. Of course, no more than one horizontal scan could be initiated by successive pulses from comparator 114 unless flip-flop 120 gets set to its "0" state between two of such pulses, which happens as explained below at the anterior edge of each symbol. Thus, each symbol is scanned horizontally only once in the illustrated embodiment. Alternatively, however, it is possible (for example, by eliminating flip-flop 122 and gate 124) and in some cases desirable to permit additional horizontal sweeps to provide multiple scans for each symbol detection cycle for the purpose of insuring greater reliability.

Comparator 116 provides detection of the anterior portion of the symbol being detected, for example as indicated by the integrated voltage 92 in FIG. 3A resulting from sweep 86 in FIG. 3. Reference voltage source 130 which may be similar to source 128 is applied to comparator 116 in the usual manner to provide the FIG. 3A threshold 84. To employ the above referenced Multiar type comparator, the voltage on line 112 may be inverted before being applied via line 129 to the input of the comparator. In this manner, as the positive voltage amplitude at the terminus of each vertical sweep on line 112 decreases, the inverted voltage would increase in amplitude in the positive direction. It is to be understood that comparator 116 is ineffective to provide a pulse on line 132 in response to any zero voltage output from integrator 94 which occurs between the times the integrated voltage is gated out to line 112. When comparator 116 detects the crossing of threshold 84 of FIG. 3A, a pulse is emitted on line 132 which resets flip-flop 120 to "0" effecting a flyback of the horizontal sweep and a turning off of the horizontal sweep generator 52, thus terminating the horizontal sweep as hereinbefore explained. This pulse, conveniently termed "End of Horizontal Scan," is also sent over line 134 to a Best Fit Detector 48 as indicated in FIG. 1. The Best Fit Detector is shown enclosed by dashed line 135 in FIG. 5. This pulse on line 134 causes a comparison, as later explained in more detail, of all the photomultiplier outputs associated with CRT's 22 to determine the configuration of the symbol that has just been scanned. In this manner one horizontal sweep, or a plurality of horizontal sweeps if desired, provides at least one complete scan of a symbol which is sufficient to provide detectable replicas of the symbols on the faces of all the CRT's 22 and thus enable detection of the symbol as hereinabove described.

In FIG. 4, comparator 118 provides for the detection of a complete absence of a symbol to permit resetting of the flip-flop 122 to the "0" state. This in turn permits a subsequent initiating of a horizontal sweep of symbol scan when the next symbol to be detected is sensed. Comparator 118 operates in the same manner as comparator 116, except that reference source 136 is set to provide a threshold that is a substantially less positive voltage than threshold 84. This is done for the following reason. At the completion of one horizontal sweep the symbol being detected is still in the area of the flying spot due to the horizontal sweep flyback returning the spot to, say, one of lines 80 (if not line 64 or further leftward) in FIG. 3. Thus, if the threshold of comparator 118 were set at a value substantially the same as that required to terminate the horizontal sweep, or if line 134 were connected to the "0" input side of flip-flop 122, the next vertical sweep after the horizontal flyback (for example sweep 138 in FIG. 3A) could initiate a new horizontal sweep causing, in a one horizontal scan per symbol embodiment, a false indication of the presence of two or more symbols. The threshold embodied in comparator 118 is set such that a vertical sweep must entirely miss the symbol which was detected in order to indicate a space two symbols on document 14. This arrangement insures that each symbol will be indicated only once by Best Fit Detector 48 regardless of the document velocity or time involved in detecting a symbol and assumes the horizontal sweep flyback will not move the spot leftward further than the front edge of the symbol just detected, which is the preferred situation for a single horizontal scan per symbol embodiment. This same type of circuit can be used with scanning systems employing multiple horizontal sweeps for a complete symbol scan. For example, the "0" input side of flip-flop 122 could also be connected to line 134 via a gate (not shown) which is enabled until a certain number of pulses occur on line 134.

As previously described, the replicas of the symbol being detected are respectively displayed on the faces of CRT's 22 of FIG. 1. The replica, which is in the form of a primary light source, is masked by symbol masks, each symbol mask having its own symbol aperture aligned with and interposed between the face of a CRT and an adjacent respective photomultiplier. The current flowing in each such photomultiplier is an electrical analog of the degree of coincidence between the symbol replica and the aperture configuration. These currents are fed into Best Fit Detector 48 which may conveniently take the form shown enclosed by dashed line 135 in FIG. 5. The output currents from photomultiplier tubes 140 represent the degree of coincidence between the replica of the symbol to be detected on CRT's 22 and the aperture configurations in masks 28. These currents are fed to a conventional summer and hold circuit 142 as well as respectively to a plurality of comparators 144 which may be of the above referenced Multiar type. The function of summer 142 is to provide an average value of all output currents from photomultipliers 140. This enables Best Fit Detector 48 to compensate for drifts in the electronic components, in the CRT's 22, in photomultipliers 140, as well as in the amount of light associated with different symbols. For improved stability of the symbol detector, the presentation system (comprising CRT's 22 and the photomultipliers 140) may conveniently employ degenerative feedback to control the intensity of the electron beams in each of the CRT's 22, thereby providing a relatively constant reference current from each of the photomultipliers 140. An example of a feedback system to control the intensity of a flying spot on a scanning CRT, but which can be equally applied to a CRT used to present symbol replica is given on page 255 in the article "Continuous Scanner for Television Film" by R. E. Graham, Bell Laboratories Record, Vol. 32, July 1954 issue, published by Bell Laboratories, New York, New York. Each pair of CRT's 22 and photomultipliers 140 can utilize the aforementioned feedback system. The intensity may be conveniently sampled at the termination of each horizontal sweep or it may be sampled at any arbitrary time.

The summer part of circuit 142 may be simply a resistive summer such as illustrated in FIG. 18.1 in Waveforms, supra, while the holding circuit thereof may conveniently take the form of the circuit illustrated in FIG. 5 of the afore-referenced application but without gate 108, where the charging of the capacitor is through a low resistance and the output resistor of the above referenced summer is substituted for resistance 100. The output pulse from comparator 114 of FIG. 4 which signifies the initiation of a horizontal sweep, i.e., symbol scan, can be applied to a terminal of the integrator to discharge the intergrating capacitor quickly while the "1" output of flip-flop 120 can be applied to another terminal to cause the capacitor to charge during each horizontal sweep, thereby permitting each scan to generate its own reference potential. This is desirable since subsequent symbols may have difference degrees of blackness and thus may provide different output currents.

An amplifier used in the holding circuit portion of the FIG. 5 circuit 142, may include a D.C. level shifter and provide some voltage gain to effectively provide an adjustable threshold for reasons hereinafter explained. The output of such an amplifier is directed via line 152 to gate 146 which may be a conventional diode-resistor gate. Gate 146 is enabled by the symbol scan termination output pulse on line 134 from comparator 116 of FIG. 4. Therefore, the average or threshold voltage derived from all photomultipliers 140 is applied to each comparator 144 only at the termination of the symbol scan. Alternatively, the average or threshold voltage from circuit 142 may be continuously fed to comparators 144 while the output currents from photomultipliers 140 are respectively gated to comparators 144 in the just described manner. The gating function of gate 146 is desirable to establish a time of comparison limited to the time when the replicas on the faces of CRT's 22 are complete, to prevent premature comparisons.

The negative voltage applied to resistance 148 provides a negative bias voltage to line 150 connected to all comparators 144 to prevent any output pulses therefrom prior to the proper sampling time as determined by comparator 116 of FIG. 4. Resistance 148 is a high impedance so that when the gate 146 is enabled by a pulse on line 134, the low output impedance thereof causes the voltage on line 150 to assume the voltage on line 152 which is the output of summer and hold circuit 142, i.e., the above mentioned average or instant threshold voltage. The negative bias voltage on resistance 148 is made to exceed any expected voltages which may be developed from the maximum output currents in the input impedance of comparators 144 from photomultipliers 140.

As the voltage on line 152 is applied to comparators 144 through gate 146, there will be one and only one of the comparators 144 which has a photomultiplier minimum current input indicative of coincidence between the symbol replica and the mask aperture associated therewith. This minimum current can be conveniently converted to a voltage by passing it through a fixed resistance and compared with the instant average or threshold voltage from circuit 142. If the outputs from photomultipliers 140 are respectively directed to the input terminal of the Multiar type comparator 144 as illustrated in FIGS. 9–20 of Waveforms, supra, and the threshold voltage is applied to the reference voltage terminal thereof, the threshold voltage will exceed only one of the input voltages from photomultipliers 140; thus only one of the comparators 144 will provide a pulse output indicating which symbol is on the document 14. The gain of the D.C. level shifter contained in the hold circuit of 142 is adjusted for each set of acceptable symbols so as to provide a threshold between the symbols most resembling each other. Thus there is shown apparatus which can reliably detect symbols on a document.

While there has been shown and described and pointed out the fundamental novel features of the method of this invention as applied to a specific piece of equipment, it will be understood that various omissions and substitutions and changes in the form and details of the equipment illustrated may be made by those skilled in the art without departing from the spirit of the invention. It is the intention, therefore, to be limited only as indicated by the scope of the following claims.

What is claimed is:

1. In symbol detection apparatus of the type including means for photoelectrically scanning a document, means for developing electrical signals characteristic of a symbol being scanned, and cathode-ray tube means responsive to said signals for visually reproducing the configuration of said symbol, means for controlling said reproducing means comprising: at least one cathode-ray tube; sweep signal generating means connected to said cathode-ray tube means; circuit means responsive to electrical signals characteristic of a symbol being scanned connected to said generating means for initiating said generator when said electrical signals exceed a first predetermined threshold; and means responsive to said electrical signals for resetting said circuit means only when said electrical signals fall below a second predetermined threshold.

2. In symbol detection apparatus of the type including means for photoelectrically scanning a document, means for developing electrical signals characteristic of a symbol being scanned, and cathode-ray tube means responsive to said signals for reproducing at a remote point the configuration of said symbol, means for controlling said reproducing means comprising: at least one cathode-ray tube; sweep signal generating means connected to said cathode-ray tube means; circuit means responsive to electrical signals characteristic of a symbol being scanned connected to said generating means for initiating said generator and for preventing any further initiation of it when said electrical signals exceed a first predetermined threshold; and means responsive to said electrical signals for resetting said circuit means when said electrical signals fall below a second predetermined threshold to again enable said circuit means for permitting a subsequent initiation of said generating means.

3. In symbol detection apparatus of the type including means for photoelectrically scanning a document, means for developing electrical signals characteristic of a symbol being scanned, and cathode-ray tube means responsive to said signals for reproducing at a remote point the configuration of said symbol, means for controlling said reproducing means comprising: at least one cathode-ray tube; sweep signal generating means connected to said cathode-ray tube means; circuit means including first comparator means responsive to electrical signals characteristic of a symbol being scanned connected to said generating means for initiating said generator and for preventing a further initiation of it when said electrical signals exceed a first predetermined threshold; and means including second comparator means responsive to said electrical signals for resetting said circuit means when said electrical signals fall below a second predetermined threshold to again condition said circuit means thereby permitting a subsequent initiation of said generating means.

4. In symbol detection and recognition apparatus of the type including means for photoelectrically scanning a document, means for developing electrical signals characteristic of a symbol being scanned, and cathode-ray tube means responsive to said signals for reproducing the configuration of said symbol, means for controlling said reproducing means comprising: a plurality of cathode-ray tubes; sweep signal generating means connected to said cathode-ray tube means; gating means having first and second input terminals and an output terminal; means for applying electrical signals characteristic of a symbol being scanned to said first terminal; signal comparator means connected to said output terminal for comparing said electrical signals passing through said gating means to a first predetermined threshold; means responsive to the output from said first comparing means occurring when said electrical signal exceeds said threshold for initiating said generating means; and means connected to the second terminal of said gating means responsive to the output of said first comparison means for preventing further of said electrical signals above a second predetermined threshold from passing through said gating means.

5. In symbol detection and recognition apparatus of the type including means for photoelectrically scanning a document, means for developing electrical signal characteristic of a symbol being scanned, and cathode-ray tube means responsive to said signals for reproducing at a remote point the configuration of said symbol, means for controlling said reproducing means comprising: a plurality of cathode-ray tubes; sweep signal generating means connected to said cathode-ray tube means; gating means having first and second input terminals and an output terminal; means for applying electrical signals characteristic of a symbol being scanned to said first terminal; signal comparison means connected to said output terminal for comparing said electrical signals passing through said gating means to a first predetermined threshold; means responsive to the output from said first comparing means occurring when said electrical signal exceeds said threshold for initiating said generating means; and a bistable flip-flop circuit having one output terminal thereof connected to the second terminal of said gating means; means for connecting the output of said first comparison means to one input of said flip-flop for preventing further of said electrical signals from passing through said gating means; further comparator means connected to said means for applying electrical signals; and means connecting the output of said further comparator means to the other input of said flip-flop such that when said electrical signal fails to compare to a second predetermined level, said gating means is again enabled.

References Cited by the Examiner

UNITED STATES PATENTS

| | | | |
|---|---|---|---|
| 2,646,465 | 7/53 | Davis | 340—146.3 |
| 2,919,425 | 12/59 | Ress | 340—146.3 |
| 2,933,246 | 4/60 | Rabinow | 340—146.3 |
| 3,085,226 | 4/63 | Brown | 340—146.3 |
| 3,085,227 | 4/63 | Brown | 340—146.3 |

MALCOLM A. MORRISON, *Primary Examiner.*

IRVING L. SRAGOW, WALTER W. BURNS, Jr., *Examiners.*